(12) United States Patent
Tanaka et al.

(10) Patent No.: US 10,720,872 B2
(45) Date of Patent: Jul. 21, 2020

(54) MOTOR CONTROL DEVICE AND MACHINE TOOL SYSTEM FOR CONTROLLING MOTOR IN ACCORDANCE WITH AMOUNT OF DROP IN POWER SUPPLY VOLTAGE

(71) Applicant: FANUC CORPORATION, Yamanashi (JP)

(72) Inventors: Shunpei Tanaka, Yamanashi (JP); Shinichi Horikoshi, Yamanashi (JP); Yuuta Sekikawa, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 38 days.

(21) Appl. No.: 16/043,162

(22) Filed: Jul. 24, 2018

(65) Prior Publication Data

US 2019/0052216 A1 Feb. 14, 2019

(30) Foreign Application Priority Data

Aug. 10, 2017 (JP) .................................. 2017-155189

(51) Int. Cl.
*H02P 27/08* (2006.01)
*G05B 19/406* (2006.01)
(Continued)

(52) U.S. Cl.
CPC ............ *H02P 27/08* (2013.01); *G05B 19/406* (2013.01); *H02P 5/74* (2013.01); *H02P 29/032* (2016.02); *G05B 2219/34316* (2013.01)

(58) Field of Classification Search
CPC ........... H02P 27/06; H02P 27/08; H02P 5/74; H02M 1/32; H02M 5/4585
See application file for complete search history.

(56) References Cited

U.S. PATENT DOCUMENTS 8,030,878 B2 * 10/2011 Iwashita ................ G01R 31/42
318/802
2011/0254485 A1 * 10/2011 Clothier .................... H02P 6/14
318/400.14
(Continued)

FOREIGN PATENT DOCUMENTS

CN 103812391 A 5/2014
CN 104426457 A 3/2015
(Continued)

*Primary Examiner* — Shawki S Ismail
*Assistant Examiner* — Zoheb S Imtiaz
(74) *Attorney, Agent, or Firm* — Hauptman Ham, LLP (57) ABSTRACT

A motor control device includes a rectifier which converts AC power into DC power and outputs it to a DC link, an inverter which converts the DC power of the DC link into AC power for each motor and outputs it, an AC voltage detection unit which detects an AC voltage value on the AC input side of the rectifier, a state determination unit which determines that a voltage dropped state has been set when the AC voltage value is smaller than a certain specified voltage and that a normal state has been set when the AC voltage value is equal to or larger than the specified voltage, and an output control unit which controls each motor in accordance with the amount of voltage drop with respect to the specified voltage of the AC voltage value when the state determination unit determines that the voltage dropped state has been set.

9 Claims, 7 Drawing Sheets

(51) Int. Cl.
*H02P 5/74* (2006.01)
*H02P 29/032* (2016.01)

(56) References Cited

U.S. PATENT DOCUMENTS

| | | | | |
|---|---|---|---|---|
| 2013/0187589 A1* | 7/2013 | Okita | .................. | G05B 9/02 |
| | | | | 318/566 |
| 2014/0001993 A1* | 1/2014 | Iwata | .................. | H02P 27/04 |
| | | | | 318/400.26 |
| 2015/0280603 A1* | 10/2015 | Yuasa | .................. | H02M 5/458 |
| | | | | 363/37 |
| 2016/0087558 A1* | 3/2016 | Yamamoto | ............... | G05B 9/02 |
| | | | | 318/563 |

FOREIGN PATENT DOCUMENTS

| | | | |
|---|---|---|---|
| CN | 105450145 | A | 3/2016 |
| CN | 105763131 | A | 7/2016 |
| CN | 106208876 | A | 12/2016 |
| JP | 2000-354396 | A | 12/2000 |
| JP | 2006-288053 | A | 10/2006 |
| JP | 2010-250697 | A | 11/2010 |
| JP | 2013-153605 | A | 8/2013 |
| JP | 2013-153607 | A | 8/2013 |
| JP | 2014-96929 | A | 5/2014 |
| JP | 2014-147226 | A | 8/2014 |
| JP | 2016-63705 | A | 4/2016 |
| JP | 2017-75612 | A | 4/2017 |

\* cited by examiner

MOTOR CONTROL DEVICE AND MACHINE TOOL SYSTEM FOR CONTROLLING MOTOR IN ACCORDANCE WITH AMOUNT OF DROP IN POWER SUPPLY VOLTAGE

RELATED APPLICATIONS

The present application claims priority of Japanese Application Number 2017-155189, filed Aug. 10, 2017, the disclosure of which is hereby incorporated by reference herein in its entirety.

BACKGROUND OF THE INVENTION

1. Field of the Invention

The present invention relates to a motor control device and a machine tool system for controlling a motor in accordance with the amount of drop in power supply voltage.

2. Description of the Related Art

In a machine tool, a motor is used as a drive source for driving an axis on which a tool or a workpiece is mounted. In a machine tool including a motor control device which controls motors respectively provided to drive a feed axis and a spindle axis, AC power input from an AC power supply is temporarily converted into DC power, the DC power is further converted into AC power, and the AC power is used as drive power for the motor provided for each drive axis. Such a machine tool includes, as a main circuit for the motor control device, a rectifier which converts AC power input from an AC power supply into DC power and outputs it to a DC link, and an inverter which converts the DC power stored in a DC link capacitor provided in the DC link into AC power supplied as drive power for each motor and outputs it, and the tool controls the speed, the torque, or the rotor position of each Motor connected to the AC output of the inverter. During acceleration of the spindle axis or the feed axis, since the motor consumes power in large quantities, the AC power supply may preferably output a high AC power.

As disclosed in, e.g., Japanese Unexamined Patent Publication (Kokai) No. 2010-250697, a controller for a machine tool is known to include first power consumption calculation means for calculating a power consumption of a feed axis driving motor, second power consumption calculation means for calculating a power consumption of a device which operates at a constant power, and motor control means for determining a time constant correlated with at least one of an acceleration time and a deceleration time of the feed axis driving motor, based on a sum of the power calculated by the first power consumption calculation means and the power calculated by the second power consumption calculation means, and controlling the feed axis driving motor, based on the time constant.

As disclosed in, e.g., Japanese Unexamined Patent Publication (Kokai) No. 2013-153605, a motor control device is known to include a power supply unit which converts AC power input from a commercial power supply into DC power and outputs the DC power to a DC generating line, a motion command generation unit which generates an operation command, an acceleration and deceleration processing unit which outputs a servo command by acceleration and deceleration processing for the operation command generated by the motion command generation unit, a servo control unit which converts the DC power output from the power supply unit to the DC generating line into AC power involved in operating a motor in accordance with the servo command and outputs the AC power to the motor, an electrical storage device provided to supply to the servo control unit, a shortage of the power supplied from the power supply unit to the servo control unit and absorb regenerative power that exceeds a regeneration capacity of the power supply unit of regenerative power of the motor, a charge and discharge circuit provided between the DC generating line and the electrical storage device, a charge and discharge command generation unit which generates a charge and discharge command based on the operation command output from the motion command generation unit, and a charge and discharge circuit control unit which causes the charge and discharge circuit to perform an operation for discharge from the electrical storage device to the DC generating line and an operation for charge from the DC generating line to the electrical storage device, based on a power of the DC generating line, an amount of electricity stored in the electrical storage device, and the charge and discharge command.

As disclosed in, e.g., Japanese Unexamined Patent Publication (Kokai) No. 2014-96929, a controller for a machine tool including a feed axis motor which drives a feed axis and a spindle axis motor which drives a spindle axis is known to include a converter which performs mutual power conversion between an AC voltage in an AC power supply and a DC voltage in a DC link on a DC side, an inverter for the feed axis motor which performs mutual power conversion between the DC voltage in the DC link and the AC voltage in the feed axis motor and supplies drive power to the feed axis motor, an inverter for the spindle axis motor which performs mutual power conversion between the DC voltage in the DC link and an AC voltage in the spindle axis motor and supplies drive power to the spindle axis motor, power failure detection means for detecting whether power failure has occurred in the AC power supply of the converter, voltage detection means for detecting the DC voltage in the DC link, and control means for outputting a feed axis motor decelerate command used to control the mutual power conversion of the inverter for the feed axis motor to decelerate the feed axis motor when the power failure detection means detects power failure, the control means outputting, when the power failure detection means detects power failure, a spindle axis motor accelerate command used to control the mutual power conversion of the inverter for the spindle axis motor to accelerate the spindle axis motor if the DC voltage detected by the voltage detection means is higher than a predetermined upper limit, and a spindle axis motor decelerate command used to control the mutual power conversion of the inverter for the spindle axis motor to decelerate the spindle axis motor if the DC voltage detected by the voltage detection means is lower than a predetermined lower limit that is lower than the predetermined upper limit.

SUMMARY OF INVENTION

As in, e.g., acceleration of the spindle axis or the feed axis, when the power consumption of the motor is relatively large, as the power supply capacity of the AC power supply runs short with respect to the AC power involved for the motor control device, the AC voltage on the AC input side of the rectifier in the motor control device drops. When the AC voltage on the AC input side of the rectifier drops, the rectifier may not supply to the DC link capacitor, DC power involved in generating AC power for motor driving by the inverter. As a result, the use of insufficient DC power stored in the DC link capacitor may not allow the inverter to generate AC power involved in driving the motor, so the motor control device and the machine tool including the same may not accidentally make an alarm stop. Therefore, a demand has arisen for a technique for restraining any alarm stop of the motor control device due to the insufficient power supply capacity of the AC power supply to improve the machine operating ratio.

In one aspect of the present disclosure, a motor control device for controlling a plurality of motors which respectively drive different axes includes a rectifier configured to convert AC power input from an AC power supply into DC power and output the DC power to a DC link, an inverter configured to convert the DC power of the DC link into AC power to be supplied as drive power for each of the motors and outputs the AC power, an AC voltage detection unit configured to detect an AC voltage value on an AC input side of the rectifier, a state determination unit configured to determine that a voltage dropped state has been set when the AC voltage value is smaller than a certain specified voltage and that a normal state has been set when the AC voltage value is not less than the specified voltage, and an output control unit configured to control each of the motors in accordance with an amount of voltage drop with respect to the specified voltage of the AC voltage value when the state determination unit determines that the voltage dropped state has been set.

In another aspect of the present disclosure, a machine tool system includes a machine tool including the above-mentioned motor control device, a plurality of numerical control devices, each of which is provided in correspondence with the machine tool and controls the machine tool, the numerical control device including a power consumption calculation unit which calculates power consumptions of the machine tool, a peripheral device of the machine tool, and the numerical control device, a host controller configured to acquire the power consumptions from the power consumption calculation units in the plurality of numerical control devices and calculates a sum of the power consumptions, and a communication network configured to communicably connect the plurality of numerical control devices to the host controller, wherein when the state determination unit determines that the voltage dropped state has been set, and the sum of the power consumptions calculated by the host controller exceeds a power supply capacity of an AC power supply which supplies drive power to the machine tool, the peripheral device of the machine tool, and the numerical control device, the output control unit controls each of the motors in accordance with the amount of voltage drop with respect to the specified voltage of the AC voltage value.

BRIEF DESCRIPTION OF THE DRAWINGS

The present invention will be more clearly understood with reference to the following accompanying drawings.

DETAILED DESCRIPTION

A motor control device and a machine tool system for controlling a motor in accordance with the amount of drop in power supply voltage will be described below with reference to the drawings. However, it should be understood that the present invention is not limited to the drawings or the following embodiments. In the drawings, the same reference numerals denote the same members. These drawings use different scales as appropriate to facilitate an understanding. The rotational angular speed of a motor will be simply referred to as the "speed" or the "rotation speed" hereinafter.

Figure 1:
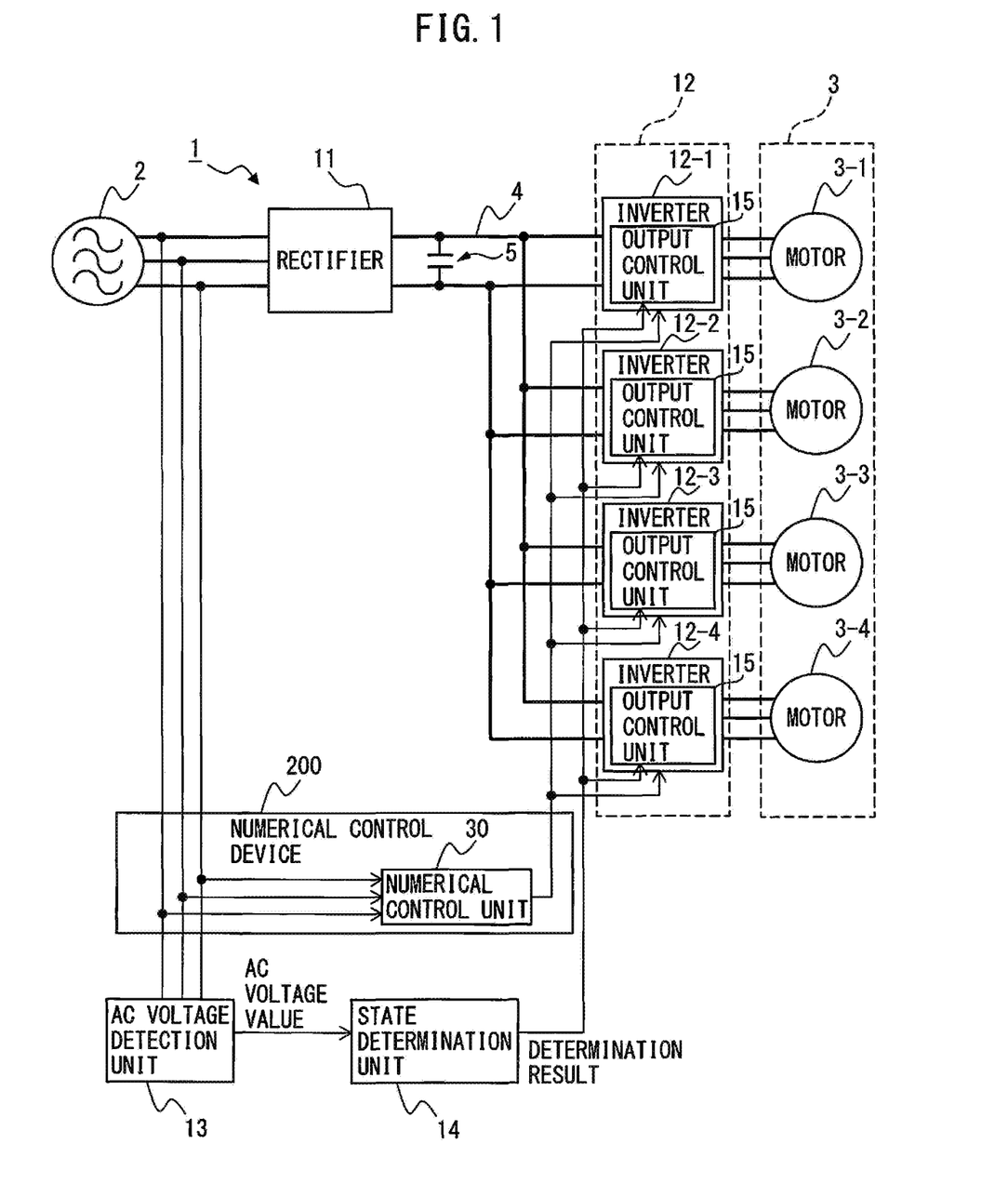
FIG. 1 is a block diagram illustrating a motor control device according to one embodiment.

FIG. 1 is a block diagram illustrating a motor control device according to one embodiment. A motor control device 1 controls a plurality of motors which respectively drive different axes. Generally, in a machine tool, a motor is provided as a drive source for each axis on which a tool or a workpiece is mounted. The embodiment illustrated in FIG. 1 assumes as an example, that a motor 3-1 of motors 3 is used to drive the spindle axis of the machine tool, and motors 3-2, 3-3, and 3-4 are used to drive the feed axis of the machine tool. The case where four motors 3 are controlled by the motor control device 1 connected to an AC power supply 2 will be taken as an example herein. However, the number of motors 3 does not particularly limit this embodiment and may be other than this number. The numbers of phases of the power supply 2 and the motors 3 do not particularly limit this embodiment, either, and a three- or single-phase configuration, for example, may be used in the embodiment illustrated in FIG. 1, the AC power supply 2 is implemented as a three-phase AC power supply, and the motors 3 are implemented as three-phase AC motors. The type of motor 3 does not particularly limit this embodiment, either, and an induction or synchronous motor, for example, may be used.

A drive command is generated for any axis of the machine tool by a numerical control unit 30 in a numerical control device 200. The numerical control unit 30 generates a drive command for machining a workpiece moved by the feed axis, using a tool mounted on the spindle axis, based on a predetermined machining program. The machining program is information obtained by programming command processing for performing a predetermined task by the machine tool. The machining program includes information such as an operation command for moving a workpiece by the feed axis, an operation command for rotating a tool mounted on the spindle axis, a command for sending an arbitrary signal to the exterior, and a command for reading the state of an arbitrary signal. The machining program may also include the position information of a tool relative to a workpiece, and the number of a signal to be operated. Any command which can be registered on the program is applicable, as a matter of course. In other words, the programming information exemplified herein does not limit this embodiment. The drive command generated by the numerical control unit 30 is sent to an inverter 12, which performs a power conversion operation based on the received drive command.

The motor control device 1 according to one embodiment includes a rectifier 11, inverters 12, an AC voltage detection unit 13, a state determination unit 14, and output control units 15. The state determination unit 14 and the output control unit 15 are constructed in, e.g., software program form, or constructed as a combination of various electronic circuits and a software program to form a semiconductor integrated circuit into which a software program medium for implementing the function of each unit is written. In the embodiment illustrated in FIG. 1, a computer operating in accordance with a software program medium for implementing the functions of the state determination unit 14 and the output control unit 15 is provided independently of the numerical control device 200. In particular, in this embodiment, the output control unit 15 is provided in each inverter 12.

The rectifier 11 converts AC power input from the AC power supply 2 into DC power and outputs it to a DC link 4. In the embodiment illustrated in FIG. 1, since the AC power supply 2 serves as a three-phase AC power supply, the rectifier 11 is implemented in a three-phase bridge circuit, while it is implemented in a single-phase bridge circuit when the AC power supply 2 serves as a single-phase AC power supply. Examples of the rectifier 11 may include a diode rectifier circuit, a 120-degree conduction rectifier circuit, and a PWM switching control rectifier circuit including a switching element. When the rectifier 11 serves as a diode rectifier circuit, it converts AC power input from the AC power supply 2 into DC power and outputs it to the DC link 4. When the rectifier 11 serves as a 120-degree conduction rectifier circuit or a PWM switching control rectifier circuit, it can be implemented as a bidirectional AC/DC-convertible power converter which converts AC power input from the AC power supply 2 into DC power and outputs it to the DC link 4, as well as converting the DC power of the DC link 4 into AC power and returning it to the AC power supply 2. When the rectifier 11 is implemented in, e.g., a PWM switching control rectifier circuit, it is implemented in a bridge circuit of switching elements and diodes connected in antiparallel with the switching elements and performs bidirectional AC/DC power conversion by ON/OFF control of each switching element in accordance with a drive command received from a host controller (not illustrated). Examples of the switching element may include a unipolar transistor such as an FET, a bipolar transistor, an IGBT, a thyristor, and a GTO, but the type of switching element itself does not limit this embodiment, and other types of switching elements may be used.

The inverter 12 converts the DC power of the DC link 4 into AC power to be supplied as drive power for each motor 3 and outputs it. The inverter 12 is implemented in a bridge circuit of switching elements and diodes connected in anti-parallel with the switching elements, and ON/OFF control of each switching element is performed based on PWM switching control of, e.g., the triangular wave comparison scheme. The inverter 12 is implemented in a three-phase bridge circuit when the motor 3 serves as a three-phase motor and in a single-phase bridge circuit when the motor 3 serves as a single-phase motor Examples of the switching element may include a unipolar transistor such as an FET, a bipolar transistor, an IGBT, a thyristor, and a GTO, but the type of switching element itself does not limit this embodiment, and other types of switching elements may be used.

FIG. 1 illustrates an example in which an inverter 12-1 is connected to the motor 3-1 for driving a spindle axis, and inverters 12-2, 12-3, and 12-4 are connected to the motors 3-2, 3-3, and 3-4, respectively, for driving a feed axis. The "inverter 12" to be referred to hereinafter may imply the "inverters 12-1, 12-2, 12-3, and/or 12-4."

The inverter 12 converts power between the DC power of the DC link 4 and the AC power serving as drive power or regenerative power for the motor 3 by ON/OFF control of each switching element based on the drive command received from the numerical control unit 30 in the numerical control device 200. More specifically, the inverter 12 performs the switching operation of the internal switching elements, based on the drive command received from the numerical control unit 30, to convert DC power supplied from the rectifier 11 via the DC link 4 into AC power having a desired voltage and a desired frequency for driving the motor 3 (inversion operation). The motor 3 thus operates based on, e.g., the variable-voltage, variable-frequency AC power. Regenerative power may occur during, e.g., deceleration of the motor 3, but the switching operation of the internal switching elements is performed based on the drive command received from the numerical control unit 30, to convert the AC regenerative power generated in the motor 3 into DC power and return it to the DC link (conversion operation).

In this embodiment, the power conversion operation of the inverter 12 is also controlled by the output control unit 15 (to be described, later).

A DC link capacitor (to be also referred to as a "smoothing capacitor" hereinafter) 5 is provided in the DC link 4 connecting the DC output of the rectifier 11 to the DC input of the inverter 12. The DC link capacitor 5 has the functions of storing DC power in the DC link 4 and of suppressing pulsation of the DC output of the rectifier 11. In the embodiment illustrated in FIG. 1, only one DC link capacitor 5 is provided on the DC output side of the rectifier 11, but a DC link capacitor 5 may be provided on the DC input side of each inverter 12.

The AC voltage detection unit 13 detects an AC voltage value on the AC input side of the rectifier 11. Examples of methods for detecting an AC voltage may include a method for using as an AC voltage value, a vector norm in a two-phase coordinate system obtained by three-phase/two-phase transformation of the AC voltage it a three-phase coordinate system in the AC power supply 2 of the rectifier 11, and a method for using as an AC voltage value, the voltage peak value of the AC voltage in a three-phase coordinate system in the AC power supply 2 of the rectifier 11. The AC voltage value detected by the AC voltage detection unit 13 is sent to the state determination unit 14.

The state determination unit 14 determines that a voltage dropped state has been set when the AC voltage value detected by the AC voltage detection unit 13 is smaller than a specified voltage and that a normal state has been set when the AC voltage value is equal to or larger than the specified voltage. The determination result obtained by the state determination unit 14 is sent to the output control unit 15. The specified voltage used in the processing of determining whether the voltage dropped state or the normal state has been set is set to, e.g., the following value. As described above, the inverter 12 converts the DC power of the DC link 4 into AC power to be supplied as drive power for each motor 3 and outputs it, but when the energy supplied the AC power supply 2 to the DC link 4 reduces due to a drop in AC voltage on the AC input side of the rectifier 11, the motor 3 may no longer be driven using the AC power generated by the inverter 12, based on the DC power stored in the DC link 4. As a result, the motor control device 1 and the machine tool including the same make an alarm stop. Therefore, in this embodiment, a value obtained by adding a certain margin due to concerns for safety to the lower limit of the AC voltage on the AC input side of the rectifier 11, which prevents any accidental alarm stop of the motor control device 1 and the machine tool including the same, is set as a specified voltage used in the processing of determining whether the voltage dropped state or the normal state has been set. The specified voltage used in the determining processing of the state determination unit 14 can be set as appropriate by, e.g., operating the motor control device 1 by experiment or practical application, or calculating the relationship between the AC voltage value on the AC input side of the rectifier 11 and the alarm stop of the motor control device 1 and the machine including the same by computer simulation.

When the state determination unit 14 determines that the voltage dropped state has been set, the output control unit 15 controls each motor 3 in accordance with the amount of voltage drop with respect to the specified voltage of the AC voltage value. The output control unit 15 controls the operation of each motor 3, but since the speed, the torque, or the rotor position of this motor 3 are controlled based on, e.g., the variable-voltage, variable-frequency AC power supplied from the inverter 12, control of this motor 3 by the output control unit 15 is eventually implemented by controlling the power conversion operation of the inverter 12.

When the state determination unit 14 determines that the normal state has been restored again after determining that the voltage dropped state has been set, the output control unit 15 cancels control for each motor 3 according to the amount of voltage drop with respect to the specified voltage of the AC voltage value, which has been done in the voltage dropped state in other words, in this case, the inverter 12 converts power in accordance with a normal drive command generated by the numerical control unit 30 in the numerical control device 200, so that each motor 3 is controlled in accordance with normal control information set assuming that the AC voltage value is in the normal state.

In other words, according to this embodiment, when the state determination unit 14 determines that the voltage dropped state has been set, until the normal state is restored again, the output control unit 15 controls each motor 3 to keep any abrupt consumption of the DC power stored in the DC link 4 less to avoid any accidental alarm stop of the motor control device 1 and the machine tool including the same. When the state determination unit 14 determines that the normal state has been restored again after determining that the voltage dropped state has been set, control for each motor 3 by the output control unit 15, which has been done in the voltage dropped state, is canceled, and a return to normal motor control by the numerical control unit 30 in the numerical control device 200 is made. In this manner, according to this embodiment, any alarm stop of the motor control device 1 due to the insufficient power supply capacity of the AC power supply 2 can be restrained to improve the machine operating ratio.

Several methods for controlling each motor 3 by the output control unit 15 when the state determination unit 14 determines that the voltage dropped state has been set will be listed herein.

In the first mode of the method for controlling each motor 3 by the output control unit 15, when the state determination unit 14 determines that the voltage dropped state has been set, the output of the motor 3-1 provided to drive a spindle axis is limited more than in the normal state. In other words, when the state determination unit 14 determines that the voltage dropped state has been set, the output control unit 15 performs control to limit the output of the motor 3-1 provided to drive a spindle axis to a value smaller than an output set when the AC voltage value on the AC input side of the rectifier 11 is in the normal state, Since the motor output is generally determined by "Torque×Rotation Speed," the output of the motor 3-1 (i.e., the AC power involved in driving the motor 3-1) can be set lower by, e.g., setting the torque command or the speed command for the motor 3-1 provided to drive a spindle axis to a value smaller than in the normal state. As a result, any abrupt consumption of the DC power stored in the DC link 4 (i.e., any abrupt drop in voltage across the two terminals of the DC link capacitor 5) can be kept less. The "limited output" when the state determination unit 14 determines that the voltage dropped state has been set can be set to a value smaller than an output set when the AC voltage value on the AC input side of the rectifier 11 is in the normal state and, for example, may be set to a constant, or may be set as a variable number according to the amount of voltage drop with respect to the specified voltage of the AC voltage value. In both cases, the torque command and/or the speed command for the voltage dropped state is newly set for the "limited output."

In the second mode of the method for controlling each motor 3 by the output control unit 15, when the state determination unit 14 determines that the voltage dropped state has been set, the acceleration time constant and the deceleration time constant of the motor 3-1 provided to drive a spindle axis are limited more than in the normal state. In other words, when the state determination unit 14 determines that the voltage dropped state has been set, the output control unit 15 performs acceleration control and deceleration control of the motor 3-1 provided to drive a spindle axis, using the acceleration time constant and the deceleration time constant limited to values smaller than an acceleration time constant and a deceleration time constant set when the AC voltage value on the AC input side of the rectifier 11 is in the normal state. The acceleration time constant and the deceleration time constant are defined as parameters in the machining program used to control the machine tool by the numerical control device 200, and when the state determination unit 14 determines that the voltage dropped state has been set, the output control unit 15 changes the acceleration time constant and the deceleration time constant in the machining program to values smaller than those set in the normal state. Performing acceleration and deceleration control of the motor 3-1 using the acceleration time constant and the deceleration time constant limited to smaller values makes the acceleration and the deceleration of the motor 3-1 lower. As a result, the change in speed of the motor 3-1 can be moderated to keep any abrupt consumption of the DC power stored in the DC link 4 less.

In the third mode of the method for controlling each motor 3 by the output control unit 15, when the state determination unit 14 determines that the voltage dropped state has been set, the output control unit 15 performs control to decelerate an accelerating motor and continue decelerating a decelerating motor of motors 3-1 provided to drive a spindle axis. Upon deceleration control for the accelerating motor, AC regenerative power occurs and the inverter 12 converts this power into DC power and returns it to the link 4, so that DC power is stored in the DC link 4. Since the decelerating motor causes AC regenerative power, DC power is stored in the DC link 4, In this manner, according to the third mode, when the state determination unit 14 determines that the voltage dropped state has been set, the motor 3-1 provided to drive a spindle axis always decelerates so that regenerative power occurs and the inverter 12 converts this power into DC power and returns it to the link 4, and no drop in DC power stored in the DC link 4 occurs, or the drop in DC power is moderate even if such a drop occurs.

In the fourth mode of the method for controlling each motor 3 by the output control unit 15, when the state determination unit 14 determines that the voltage dropped state has been set, the output control unit 15 performs control to turn off excitation for the motor 3-1 provided to drive a spindle axis. By turning off excitation for the motor 3-1, the motor 3-1 stops by a so-called "free-run stop" in which it rotates by force of inertia and stops by load or friction. This can keep any abrupt consumption of the energy (DC power) stored in the DC link 4 less. As described above, when the state determination unit 14 determines that the normal state has been restored again after determining that the voltage dropped state has been set, the output control unit 15 controls each motor 3 in accordance with normal control information set assuming that the AC voltage value is in the normal state, and according to the fourth mode, since normal control is started for the motor 3-1 having made a free-run stop when the AC voltage value returns from the voltage dropped state to the normal state, a return to the normal motor operation is made quickly.

When a plurality of motors are available to drive a spindle axis, control for a motor provided to drive a spindle axis by the output control unit 15 based on any of the first to fourth modes may be performed for all these motors, or several motors for which this control is to be performed may be selected from these motors. When, for example, the AC voltage value on the AC input side of the rectifier 11 is in the voltage dropped state, but nonetheless control such as that based on any of the first to fourth modes is not to be performed for any motor, the output control unit 15 can control motors other than this motor.

In the fifth mode of the method for controlling each motor 3 by the output control unit 15, the output control unit 15 controls the motors 3-2, 3-3, and 3-4 provided to drive a feed axis. In other words, according to the fifth mode, when the state determination unit 14 determines that the voltage dropped state has been set, the output control unit 15 limits the overrides for the speed commands of the motors 3-2, 3-3, and 3-4 provided to drive at least one feed axis more than in the normal state. Generally, in the numerical control device 200, the rotation speed can be corrected by multiplying the speed command for the motor 3 by a factor called the "override." It is a common practice to allow setting of an override of, e.g., 0% to 200% for the speed command and to provide a dial for setting the override in the numerical control device 200. In the fifth mode, when the state determination unit 14 determines that the voltage dropped state has been set, the output control unit 15 changes the overrides for the speed commands of the motors 3-2, 3-3, and 3-4 provided to drive a feed axis to values smaller than those set when the AC voltage value is in the normal state, regardless of the dial setting. When the override is reduced, the rotation speed of the motors 3-2, 3-3, and 3-4 lowers as a whole. Again, when the override is reduced, the target rotation speed of the motors 3-2, 3-3, and 3-4 lowers, and the acceleration and the deceleration before the actual rotation speed reaches the target rotation speed also lower, and the torques during acceleration and deceleration, in turn, lower. As a result, the outputs of the motors 3-2, 3-3, and 3-4 (i.e., the AC powers involved in driving the motors 3-2, 3-3, and 3-4) also lower. This can keep any abrupt consumption of the DC power stored in the DC link 4 less. When the override is individually changed for the speed commands of the motors 3-2, 3-3, and 3-4 provided to drive a feed axis, control of the positioned feed axis may not be maintained. To solve this problem, when a plurality of feed axes are present, to maintain positioning set for each feed axis, the override for the speed command is changed while maintaining synchronization for each motor provided to drive the feed axis.

According to each of the above-mentioned modes, any abrupt consumption of the energy (DC power) stored in the DC link 4 can be kept less, and any alarm stop of the motor control device 1 and the machine tool including the same, as in the conventional case, can be avoided.

When the state determination unit 14 determines that the voltage dropped state has been set, the outputs of various peripheral devices of the motors 3, the motor control device 1, and the machine tool including the same may be limited, in addition to control for each motor 3 according to the amount of voltage drop with respect to the specified voltage of the AC voltage value by the output control unit 15. In this case, for example, the determination result obtained by the state determination unit 14 is sent to the numerical control device 200, which limits the outputs of various peripheral devices (e.g., turns off a light).

Figure 2:
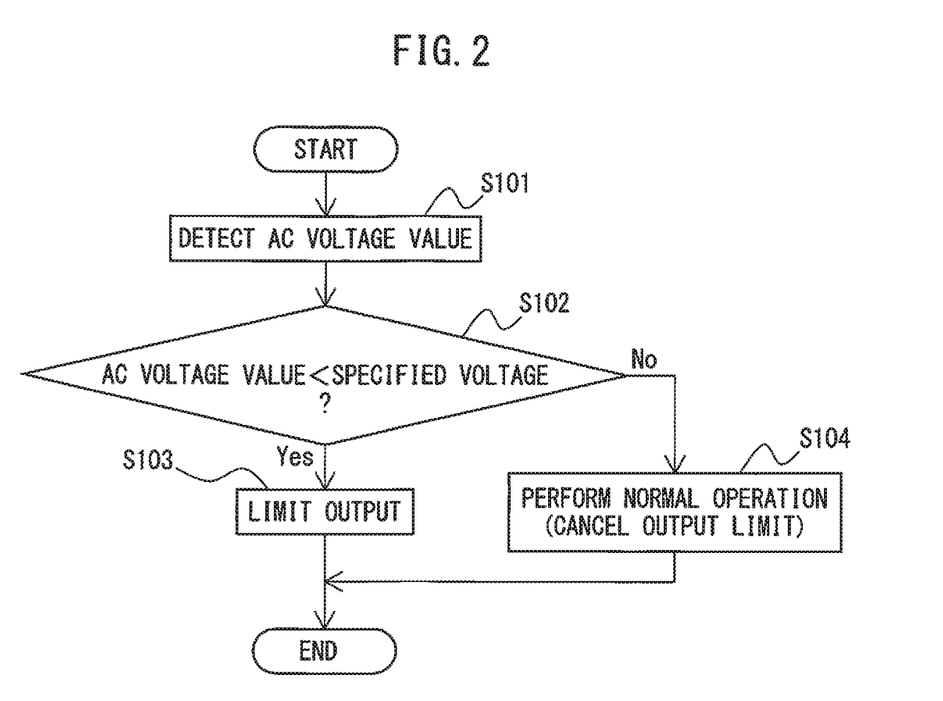
FIG. 2 is a flowchart illustrating the operation sequence of the motor control device according to one embodiment.

FIG. 2 is a flowchart illustrating the operation sequence of the motor control device according to one embodiment.

When the operations of four motors 3 are controlled by the motor control device 1 connected to the AC power supply 2, the AC voltage detection unit 13 detects an AC voltage value on the AC input side of the rectifier 11 in step S101. The AC voltage value detected by the AC voltage detection unit 13 is sent to the state determination unit 14.

In step S102, the state determination unit 14 determines whether the AC voltage value detected by the AC voltage detection unit 13 is smaller than a specified voltage. When the AC voltage value detected by the AC voltage detection unit 13 is smaller than the specified voltage, it is determined that the voltage dropped state has been set, and the process advances to step S103; otherwise, it is determined that the normal state has been set, and the process advances to step S104.

In step S103, the output control unit 15 controls each motor 3 in accordance with the amount of voltage drop with respect to the specified voltage of the AC voltage value when the state determination unit 14 determines that the voltage dropped state has been set. In the flowchart illustrated in FIG. 2, the above-mentioned first mode is employed as a method for controlling each motor 3 by the output control unit 15. In other words, in step S103, when the state determination unit 14 determines that the voltage dropped state has been set, the output control unit 15 performs control to limit the output of the motor 3-1 provided to drive a spindle axis to a value smaller than an output set when the AC voltage value on the AC input side of the rectifier 11 is in the normal state. When any of the above-mentioned second to fifth modes is employed as a method for controlling each motor 3 by the output control unit 15, the processing for keeping any abrupt consumption of the DC power stored in the DC link 4 less, as described regarding each mode, is performed in step S103. After the process in step S103, the process returns to step S101.

In step S104, each motor 3 is controlled in accordance with normal control information set assuming that the AC voltage value is in the normal state in this case, when the process in step S104 is performed after the state determination unit 14 determines in step S103 that the normal state has been restored upon control for each motor 3 according to the amount of voltage drop with respect to the specified voltage of the AC voltage value, which has been done in the voltage dropped state, control for each motor 3 according to the amount of voltage drop with respect to the specified voltage of the AC voltage value, which has been done in the voltage dropped state by the output control unit 15, is canceled, and a return to the control of the numerical control unit 30 in the numerical control device 200 is made. In other words, in this case, the inverter 12 converts power in accordance with a normal drive command generated by the numerical control unit 30 in the numerical control device 200, so that each motor 3 is controlled in accordance with normal control information set assuming that the AC voltage value is in the normal state. When the process in step S104 is performed after the state determination unit 14 determines in step S103 that the normal state still remains the same upon control for each motor 3 by the numerical control unit 30 in the numerical control device 200 according to normal control information while the AC voltage value is in the normal state, control is continuously performed by the numerical control unit 30. After the process in step S104, the process returns to step S101.

Figure 3:
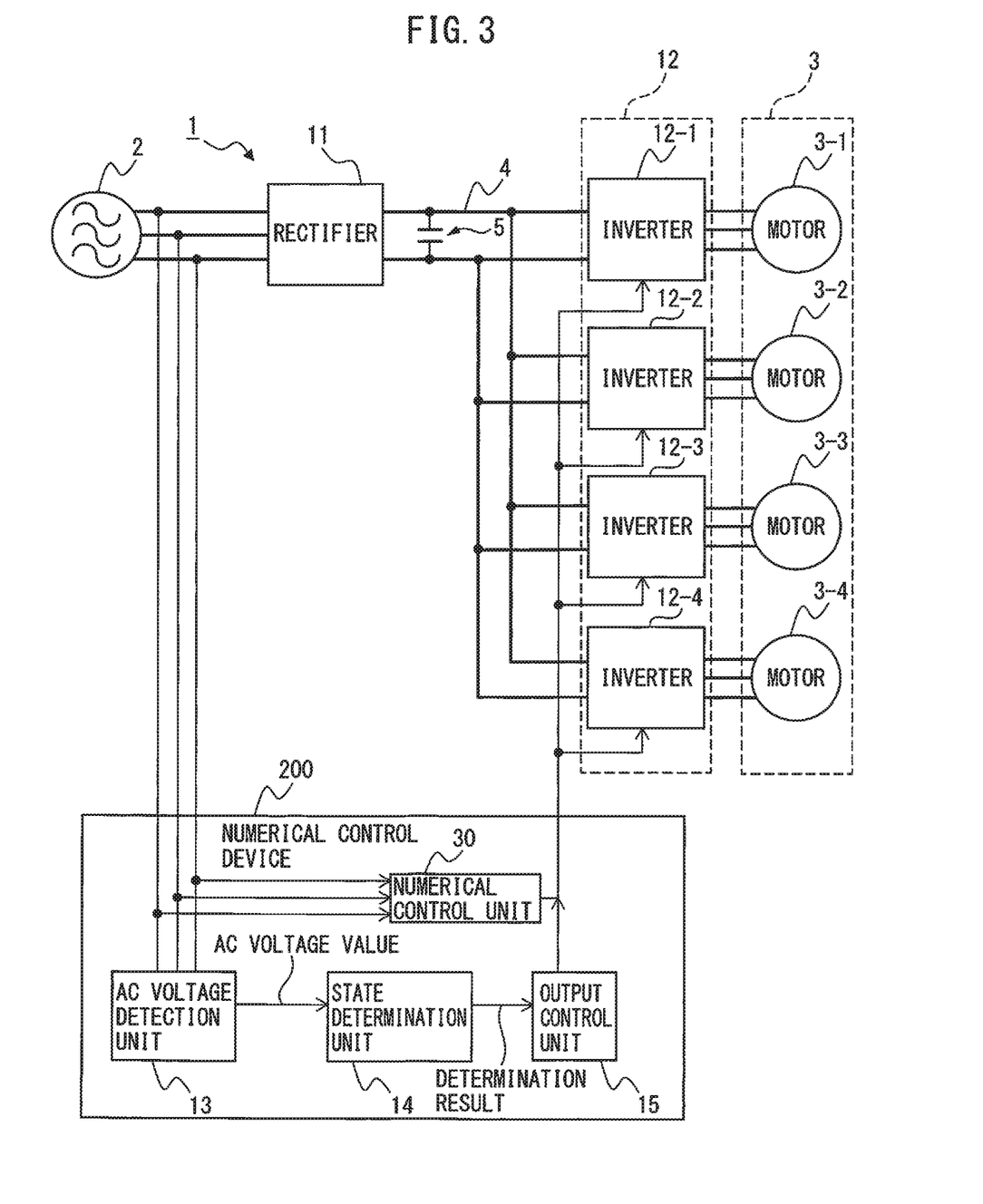
FIG. 3 is a block diagram illustrating a motor control device according to an embodiment in which an output control unit is provided in a numerical control device.

In the above-described embodiments, an output control unit. 15 is provided in each inverter 12, but it may be provided in the numerical control device 200. FIG. 3 is a block diagram illustrating a motor control device according to an embodiment in which an output control unit is provided in a numerical control device.

An AC voltage detection unit 13, a state determination unit 14, and an output control unit 15 are provided in the numerical control device 200, as illustrated in FIG. 3. Among these units, the state determination unit 14 and the output control unit 15 are constructed in software program form, and the function of each unit is implemented by causing an arithmetic, processing unit in the numerical control device 200 to operate this software program. Power conversion of the inverter 12 is controlled in accordance with a drive command generated by the numerical control unit 30 when the AC voltage value on the AC input side of the rectifier 11 is in the normal state and is controlled by the output control unit 15 when the AC voltage value on the AC input side of the rectifier 11 is in the voltage dropped state (i.e., when the state determination unit 14 determines that the voltage dropped state has been set). Since other components are the same as the circuit components illustrated in FIG. 1, the same reference numerals denote the same components, and a detailed description thereof will not be given. The motor control device 1 according to the embodiment illustrated in FIG. 3 also operates based on the flowchart illustrated in FIG. 2.

Figure 4:
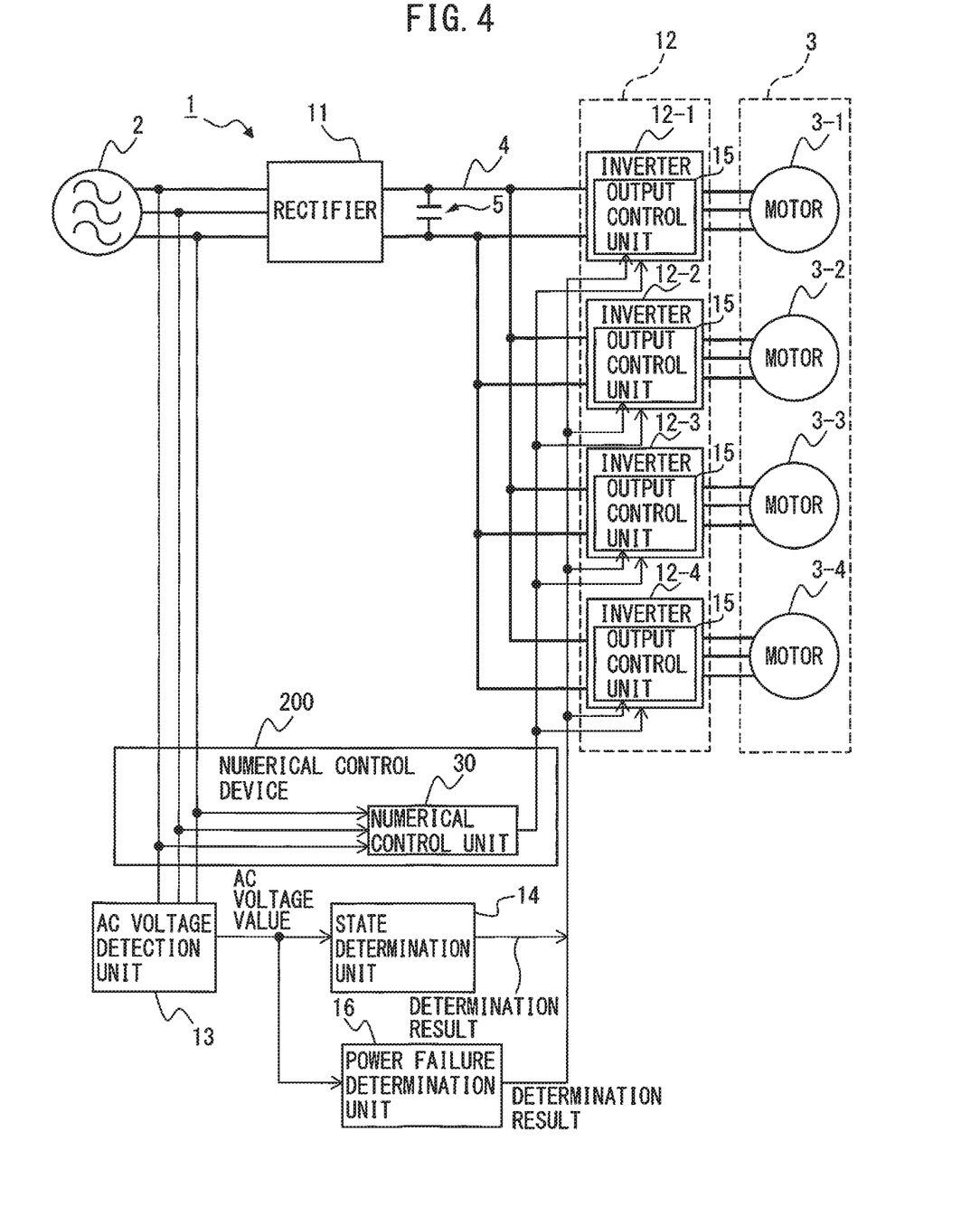
FIG. 4 is a block diagram illustrating a mode in which a power failure determination unit is provided in the embodiment illustrated in FIG. 1.
Figure 5:
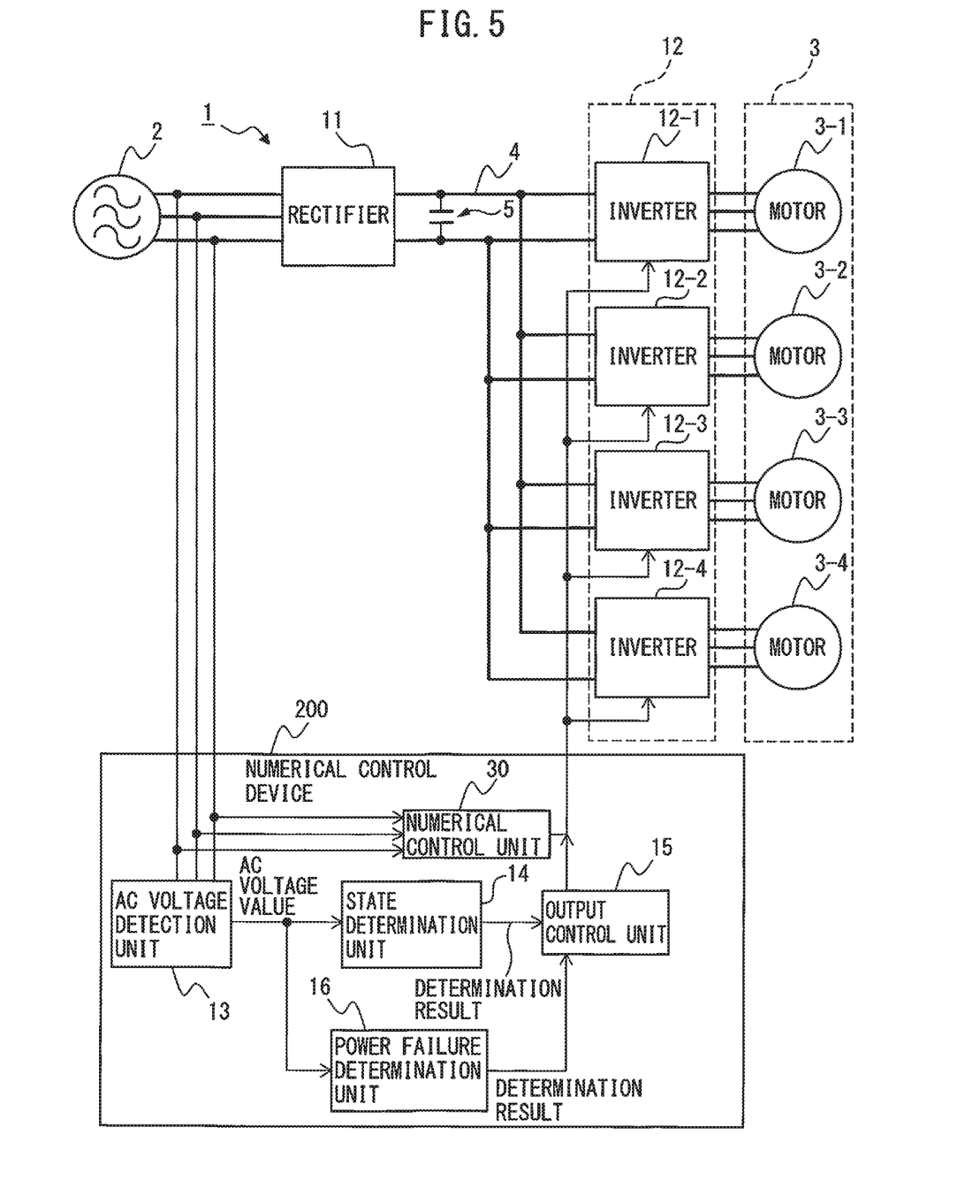
FIG. 5 is a block diagram illustrating a mode in which a power failure determination unit is provided in the embodiment illustrated in FIG. 3.

In the above-described embodiments, when the drop in AC voltage on the AC input side of the rectifier 11 is too significant to keep any abrupt consumption of the DC power stored in the DC link 4 less even by controlling each motor 3 in the voltage dropped state by the output control unit 15, it may be determined that power failure has occurred, and a protective operation may be performed. FIG. 4 is a block diagram illustrating a mode in which a power failure determination unit is provided in the embodiment illustrated in FIG. 1. FIG. 5 is a block diagram illustrating a mode in which a power failure determination unit is provided in the embodiment illustrated in FIG. 3. Referring to FIG. 4, a power failure determination unit 16 is provided independently of the numerical control device 200. Referring to FIG. 5, a power failure determination unit 16 is provided in the numerical control device 200, and in this case, the power failure determination unit 16 is constructed in software program form, and the function of the power failure determination unit 16 is implemented by causing the arithmetic processing unit in the numerical control device 200 to operate this software program. Criteria for determining power failure by the power failure determination unit 16 include a power failure voltage threshold as a criterion for determining power failure for the AC voltage value in the AC power supply 2 of the motor control device 1, and a power failure time threshold as the duration of the state in which the AC voltage value in the AC power supply 2 of the motor control device 1 is smaller than the power failure voltage threshold. The power failure voltage threshold is preferably set to a value smaller than a reference voltage used in state determination processing by the state determination unit 14. The power failure determination unit 16 determines that power failure has occurred, when the AC voltage value detected by the AC voltage detection unit 13 has been kept smaller than the power failure voltage threshold for a period of time corresponding to the power failure time threshold or more. When the power failure determination unit 16 determines that power failure has occurred, the output control unit 15 controls the inverter 12 to convert the DC power stored in the DC link 4 into AC power and supply it to the motor 3, causes the motor 3 to perform various protective operations for protecting the motor control device 1 and its peripheral devices, and then stops the operation of the motor 3. Examples of the protective operations may include a retraction operation for preventing damage to a machine tool including the motor control device 1, a tool provided in the machine tool, and a workpiece machined by the tool.

Figure 6:
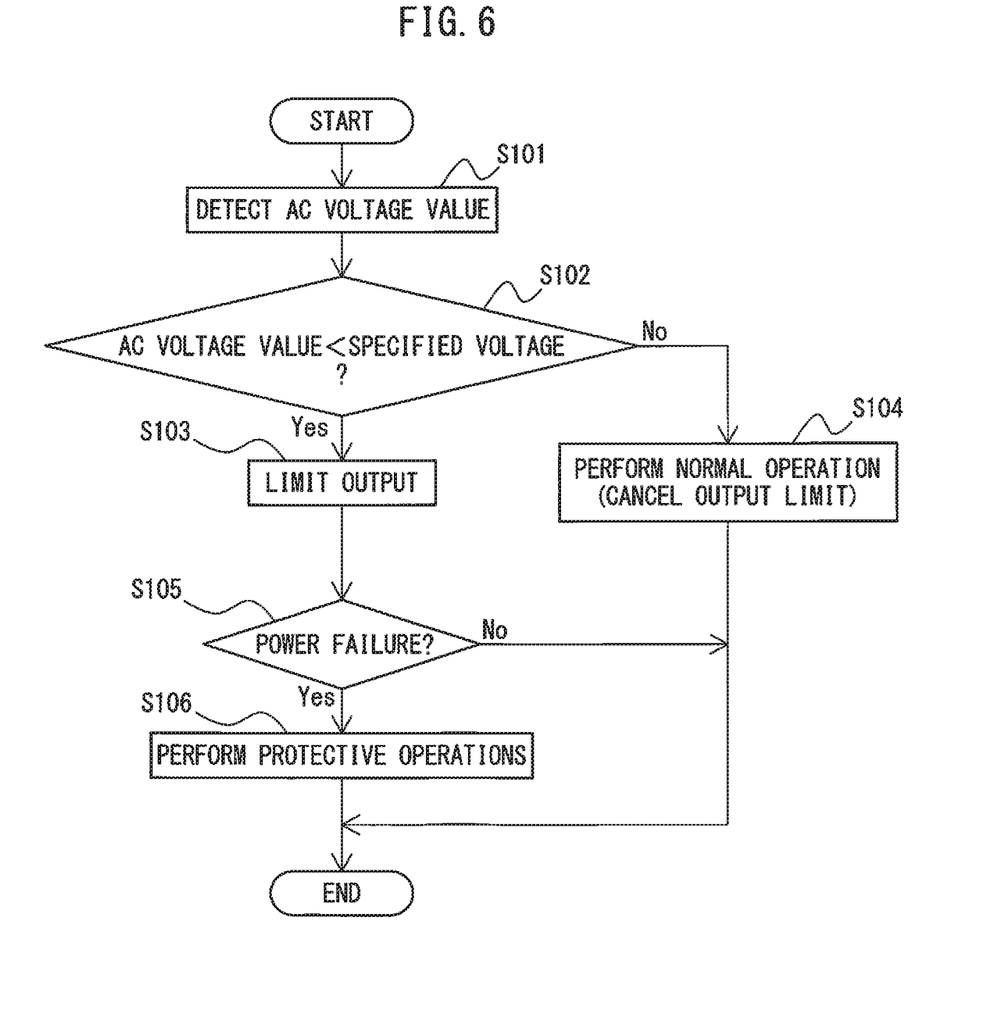
FIG. 6 is a flowchart illustrating the operation sequence of the motor control device according to each of the embodiments illustrated in FIGS. 4 and 5.

FIG. 6 is a flowchart illustrating the operation sequence of the motor control device according to each of the embodiments illustrated in FIGS. 4 and 5. Since steps S101 to S104 in FIG. 6 are the same as those in FIG. 2, a detailed description thereof will not be given. When the state determination unit 14 determines in step S102 that the voltage dropped state has been set, and each motor 3 is controlled in accordance with the amount of voltage drop with respect to the specified voltage of the AC voltage value in step S103, the power failure determination unit 16 determines in step S105 whether power failure has occurred in the AC power supply 2 of the motor control device 1 (i.e., on the AC input side of the rectifier 11). When the power failure determination unit 16 determines in step S105 that power failure has occurred, in step S106 the output control unit 15 controls the inverter 12 to convert the DC power stored in the DC link 4 into AC power and supply it to the motor 3, causes the motor 3 to perform various protective operations for protecting the motor control device 1 and its peripheral devices and then stops the operation of the motor 3.

Figure 7:
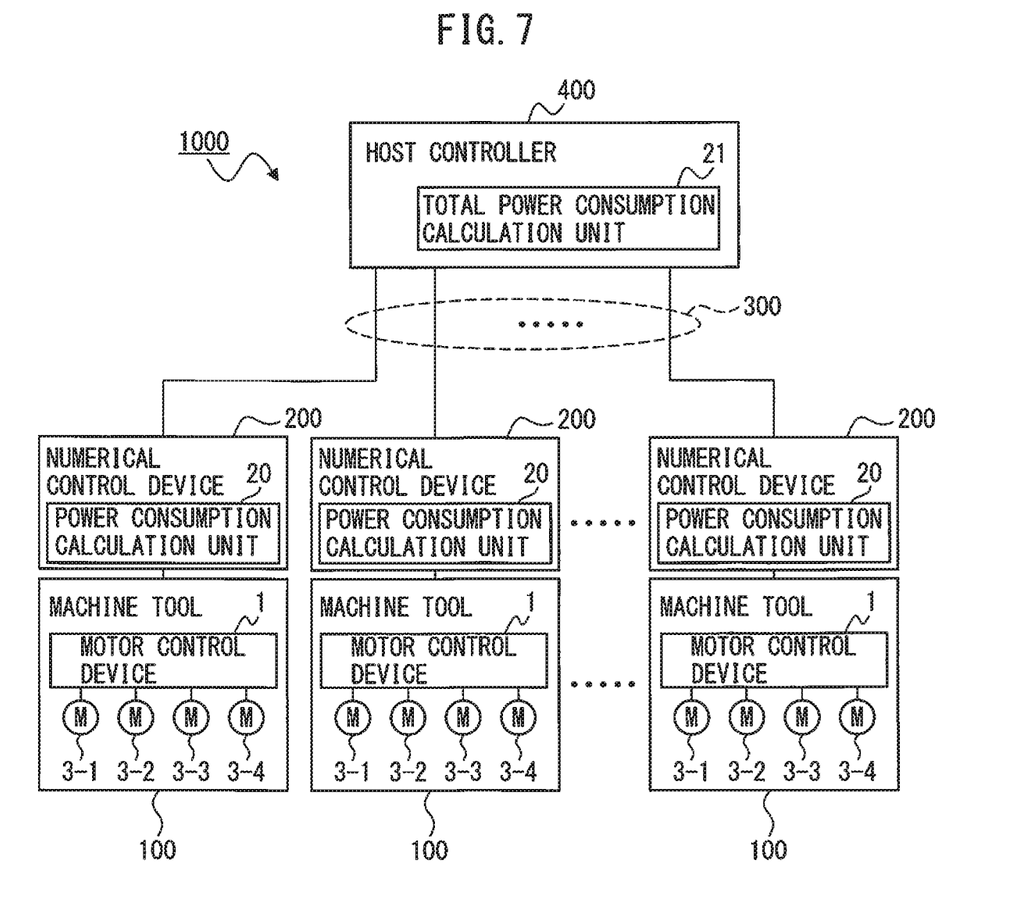
FIG. 7 is a block diagram illustrating a machine tool system including a plurality of motor control devices according to one embodiment.

A machine tool system including a plurality of motor control devices 1 connected to each other via a communication network will be described subsequently. FIG. 7 is a block diagram illustrating a machine tool system including a plurality of motor control devices according to one embodiment. In the embodiment illustrated in FIG. 7, a machine tool system 1000 including a plurality of motor control devices 1 as illustrated in FIG. 1 will be taken as an example, but this embodiment is also applicable when the machine tool system 1000 includes a plurality of motor control devices 1 as illustrated in FIGS. 3 to 5.

The machine tool system 1000 includes machine tools 100 including the motor control devices 1, numerical control device 200 which are provided in correspondence with the machine tools 100 and control the machine tools 100, a host controller 400 which communicates with the numerical control device 200, and a communication network 300 which communicably connects the host controller 400 to each numerical control device 200. Each numerical control device 200 includes a power consumption calculation unit 20 which calculates the power consumptions of the machine tool 100 controlled by this numerical control device 200, peripheral devices of this machine tool 100, and this numerical control device 200. Examples of the peripheral devices of the machine tool 100 may include a light and a loudspeaker. The host controller 400 includes a total power consumption calculation unit. 21 which calculates the sum of the power consumptions calculated by the power consumption calculation unit 20 in each numerical control device 200. The total power consumption calculation unit 21 in the host controller 400 acquires power consumptions from all power consumption calculation units 20 by communicating with the numerical control devices 200 via the communication network 300 and calculates the sum of the power consumptions.

The number of numerical control devices 200 connected to the communication network and the number of motors 3 (denoted by reference numerals 3-1, 3-2, 3-3, and 3-4 in FIG. 7) controlled by the motor control device 1 are merely illustrative, and numbers other than these examples may be used. Referring to FIG. 7, the motor 3-1 for driving the spindle axis of the machine tool 100 and the motors 3-2, 3-3, and 3-4 for driving the feed axis of the machine tool 100, which are controlled by the motor control device 1, are represented by "M." FIG. 7 does not illustrate a common AC power supply 2 connected to the motor control device 1 in each machine tool 100.

The power consumption calculation unit 20 is constructed in, e.g., software program form, and its function is implemented by causing the arithmetic processing unit in the numerical control device 200 to execute this software program. The total power consumption calculation unit 21 is constructed in, e.g., software program form, and its function is implemented by causing an arithmetic processing unit in the host controller 400 to execute this software program. As an alternative example, a computer operating in accordance with a software program medium for implementing the function of the total power consumption calculation unit 21 may be provided independently of the host controller 400.

Each power consumption calculation unit 20 calculates as a power consumption, the sum of the power consumptions of all of the machine tool 100 controlled by the numerical control device 200 including this power consumption calculation unit 20, peripheral devices of this machine tool 100, and this numerical control device 200. The power consumption of the machine tool 100 includes the power consumption of the motor control device 1 and the power consumption of the motors 3. The power consumption of the motor control device 1 is calculated as, e.g., the sum of the loss in the rectifier 11 and the losses in the inverters 12, and the power consumption of the motors 3 is calculated as, e.g., the sum of the outputs and the winding losses of the motors 3. Alternatively, the power consumption calculation unit 20 may calculate the power consumption of the motor control device 1, based on the AC voltage and the AC current detected at the connection terminal in the AC power supply 2 of the motor control device 1. The power consumption calculation unit 20 may also calculate the power consumption of the machine tool 100, based on the AC voltage and the AC current detected at the connection terminal in the AC power supply 2 of the machine tool 100. Or again, the power consumption calculation unit 20 may acquire data of the power consumption of the motor control device 1, the power consumptions of the motors 3, the power consumption of the machine tool 100, and the power consumptions of peripheral devices and/or the numerical control device 200, based on the amount of power detected by a watt-hour meter (not illustrated) provided at each position.

The total power consumption calculation unit 21 in the host controller 400 acquires power consumptions from all power consumption calculation units 20 by communicating with the numerical control devices 200 via the communication network 300 and calculates the sum of the power consumptions.

When the state determination unit 14 determines that the voltage dropped state has been set, and the total power consumption calculated by the total power consumption calculation unit 21 in the host controller 400 exceeds the power supply capacity of the AC power supply 2, the output control unit 15 provided in the motor control device 1 within each machine tool 100 controls each motor 3 by following any of the first to fifth modes, in accordance with the amount of voltage drop with respect to the specified voltage of the AC voltage value. The power supply capacity of the AC power supply 2 generally takes a fixed value, which is therefore stored in the host controller 400 in advance to allow the output control unit 15 to control each motor 3 by following any of the first to fifth modes, using the value of the power supply capacity of the AC power supply 2 stored in the host controller 400.

Since the operation of the machine tool 100 is controlled via the communication network 300 by the numerical control device 200 or its host controller 400, various types of control can be implemented.

An exemplary approach is possible in which when the excess of the total power consumption calculated by the power consumption calculation unit 20 with respect to the power supply capacity of the AC power supply 2 is small (e.g., 0% (exclusive) to 5% (exclusive)), the outputs of peripheral devices (e.g., a light) which are not directly related to the cycle time of machining by the machine tool 100 are limited, and when this excess is large (e.g., 5% (exclusive) to 10% (exclusive)), the motors 3 are controlled by following any of the first to fifth modes, although the influence that the machine tool 100 exerts on the cycle time of machining is great. Note that the excess of power can be calculated in accordance with an equation such as "(Total Power Consumption−Power Supply Capacity)/(Power Supply Capacity)." This allows selection of an axis to be limited in output, in consideration of the cycle time of the line for the machine tool 100.

Another exemplary approach is also possible in which since the host controller 400 can determine the number of workpieces machined by the machine tool 100 by monitoring the machining program of the numerical control device 200 or the like via the communication network 300, this information is transferred to the host controller 400 to preferentially limit the axes of lines faster in takt. This allows selection of an axis to be limited in output, in consideration of the cycle time of the line for the machine tool 100 as a whole.

According to one aspect of the present disclosure, any alarm stop of the motor control device due to the insufficient power supply capacity of the AC power supply can be restrained to improve the machine operating ratio.

The invention claimed is:

1. A motor control device for controlling a plurality of motors which respectively drive different axes, the motor control device comprising:

a rectifier configured to convert AC power input from an AC power supply into DC power and output the DC power to a DC link;

an inverter configured to convert the DC power of the DC link into AC power to be supplied as drive power for each of the motors and outputs the AC power;

an AC voltage detection unit configured to detect an AC voltage value on an AC input side of the rectifier;

a processor configured to:

determine that a power failure has occurred when the AC voltage value is below a predetermined power failure threshold;

determine that a voltage dropped state has been set when the AC voltage value is smaller than a certain specified voltage and that a normal state has been set when the AC voltage value is not less than the specified voltage; and a controller configured to control each of the plurality of motors in accordance with an amount of voltage drop with respect to the specified voltage of the AC voltage value when the processor determines that the voltage dropped state has been set, wherein the predetermined power failure threshold is lower than the certain specified voltage corresponding to the voltage dropped state, and in response to processor determining that the voltage dropped state has been set and the processor determining that a power failure has not occurred, the controller is configured to perform control to decelerate the motor under acceleration provided to drive a spindle axis of the axes.

2. The motor control device according to claim 1, wherein processor determines that the voltage dropped state has been set, the output control unit performs control to continue deceleration of the motor under deceleration provided to drive the spindle axis of the axes.

3. A motor control device for controlling a plurality of motors which respectively drive different axes, the motor control device comprising:

a rectifier configured to convert AC power input from an AC power supply into DC power and output the DC power to a DC link;

an inverter configured to convert the DC power of the DC link into AC power to be supplied as drive power for each of the motors and outputs the AC power;

an AC voltage detection unit configured to detect an AC voltage value on an AC input side of the rectifier;

a processor configured to:

determine that a power failure has occurred when the AC voltage value is below a predetermined power failure threshold;

determine that a voltage dropped state has been set when the AC voltage value is smaller than a certain specified voltage and that a normal state has been set when the AC voltage value is not less than the specified voltage; and a controller configured to control each of the plurality of motors in accordance with an amount of voltage drop with respect to the specified voltage of the AC voltage value when the state determination unit determines that the voltage dropped state has been set, wherein the predetermined power failure threshold is lower than the certain specified voltage corresponding to the voltage dropped state, and in response to the processor determining that the voltage dropped state has been set and that a power failure has not occurred, the controller performs control to turn off excitation for the motor under deceleration provided to drive a spindle axis of the axes.

4. The motor control device according to claim 1, wherein when the processor determines that the voltage dropped state has been set, the controller makes a change to an override for a speed command of the motor provided to drive at least one feed axis of the axes to a value smaller than a value set when the AC voltage value is in the normal state.

5. The motor control device according to claim 4, wherein the controller makes the change to the override for the speed command processor determines that the voltage dropped state has been set, while maintaining synchronization for each of the motors provided to drive the feed axis.

6. The motor control device according to claim 1, wherein when processor unit determines that the normal state has been restored after determining that the voltage dropped state has been set, the controller controls each of the plurality of motors in accordance with control information set assuming that the AC voltage value is in the normal state.

7. The motor control device according to claim 1, wherein the controller controls each of the plurality of motors by controlling a power conversion operation of the inverter.

8. A machine tool system comprising:

a machine tool comprising a motor control device, wherein the motor control device comprises:

a rectifier configured to convert AC power input from an AC power supply into DC power and output the DC power to a DC link;

an inverter configured to convert the DC power of the DC link into AC power to be supplied as drive power for each of the motors and outputs the AC power;

an AC voltage detection unit configured to detect an AC voltage value on an AC input side of the rectifier;

a processor configured to determine that a voltage dropped state has been set when the AC voltage value is smaller than a certain specified voltage and that a normal state has been set when the AC voltage value is not less than the specified voltage; and a controller configured to control each of a plurality of motors in accordance with an amount of voltage drop with respect to the specified voltage of the AC voltage value when the processor determines that the voltage dropped state has been set, wherein when the processor determines that the voltage dropped state has been set, the controller performs control to decelerate the motor under acceleration provided to drive a spindle axis of the axes;

a plurality of numerical control devices, each of which is provided in correspondence with the machine tool and controls the machine tool, the numerical control device comprising a power consumption calculator which calculates power consumptions of the machine tool, a peripheral device of the machine tool, and the numerical control device;

a host controller configured to acquire the power consumptions from the power consumption calculation units in the plurality of numerical control devices and calculates a sum of the power consumptions; and a communication network configured to communicably connect the plurality of numerical control devices to the host controller, wherein when the processor determines that the voltage dropped state has been set, and the sum of the power consumptions calculated by the host controller exceeds a power supply capacity of an AC power supply which supplies drive power to the machine tool, the peripheral device of the machine tool, and the numerical control device, the controller controls each of the plurality of motors in accordance with the amount of voltage drop with respect to the specified voltage of the AC voltage value.

9. A machine tool system comprising:

a machine tool comprising a motor control device for controlling a plurality of motors which respectively drive different axes, the motor control device comprising: a rectifier configured to convert AC power input from an AC power supply into DC power and output the DC power to a DC link; an inverter configured to convert the DC power of the DC link into AC power to be supplied as drive power for each of the motors and outputs the AC power; an AC voltage detection unit configured to detect an AC voltage value on an AC input side of the rectifier; a state determination unit configured to determine that a voltage dropped state has been set when the AC voltage value is smaller than a certain specified voltage and that a normal state has been set when the AC voltage value is not less than the specified voltage; and an output control unit configured to control each of the motors in accordance with an amount of voltage drop with respect to the specified voltage of the AC voltage value when the state determination unit determines that the voltage dropped state has been set, a plurality of numerical control devices, each of which is provided in correspondence with the machine tool and controls the machine tool, the numerical control device comprising a power consumption calculation unit which calculates power consumptions of the machine tool, a peripheral device of the machine tool, and the numerical control device;

a host controller configured to acquire the power consumptions from the power consumption calculation units in the plurality of numerical control devices and calculates a sum of the power consumptions; and a communication network configured to communicably connect the plurality of numerical control devices to the host controller, wherein when the state determination unit determines that the voltage dropped state has been set, and the sum of the power consumptions calculated by the host controller exceeds a power supply capacity of an AC power supply which supplies drive power to the machine tool, the peripheral device of the machine tool, and the numerical control device, the output control unit controls each of the motors in accordance with the amount of voltage drop with respect to the specified voltage of the AC voltage value.

* * * * *